US009482757B2

(12) United States Patent
Lee

(10) Patent No.: US 9,482,757 B2
(45) Date of Patent: Nov. 1, 2016

(54) APPARATUS AND METHOD FOR PROCESSING POSITION INFORMATION

(75) Inventor: Jong Bok Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 672 days.

(21) Appl. No.: 13/614,937

(22) Filed: Sep. 13, 2012

(65) Prior Publication Data
US 2013/0147662 A1 Jun. 13, 2013

(30) Foreign Application Priority Data

Dec. 8, 2011 (KR) ........................ 10-2011-0131206

(51) Int. Cl.
G01S 19/05 (2010.01)
G01S 19/11 (2010.01)
G01S 19/46 (2010.01)

(52) U.S. Cl.
CPC ................ *G01S 19/11* (2013.01); *G01S 19/46* (2013.01)

(58) Field of Classification Search
CPC ......... G01S 19/05; G01S 19/11; G01S 19/46
USPC .................................................... 342/357.42
See application file for complete search history.

(56) References Cited

U.S. PATENT DOCUMENTS

| 6,650,288 B1* | 11/2003 | Pitt | G01S 19/05 |
| | | | 342/357.42 |
| 2006/0046749 A1* | 3/2006 | Pomerantz | H04W 64/00 |
| | | | 455/457 |
| 2006/0103574 A1* | 5/2006 | Geier | G01S 19/42 |
| | | | 342/357.25 |
| 2007/0026792 A1* | 2/2007 | Korneluk | G01S 19/03 |
| | | | 455/10 |
| 2011/0227787 A1* | 9/2011 | Gum | G01S 19/215 |
| | | | 342/357.28 |
| 2012/0056781 A1* | 3/2012 | Kong | G01S 19/252 |
| | | | 342/357.42 |
| 2012/0256789 A1* | 10/2012 | Bull | G01S 5/0221 |
| | | | 342/357.25 |

FOREIGN PATENT DOCUMENTS

| CN | 1520227 A | 8/2004 |
| CN | 2932885 Y | 8/2007 |
| CN | 101063715 A | 10/2007 |
| JP | 04-025782 A | 1/1992 |
| JP | 11-304905 A | 11/1999 |
| JP | 2003057332 A | 2/2003 |
| JP | 2005-017198 A | 1/2005 |
| JP | 2007071665 A | 3/2007 |
| JP | 2008-054119 A | 3/2008 |
| JP | 2008298443 A | 12/2008 |
| WO | 2006022318 A1 | 3/2006 |

* cited by examiner

*Primary Examiner* — Harry Liu
(74) *Attorney, Agent, or Firm* — Mintz Levin Cohn Ferris Glovsky and Popeo, P.C.; Peter F. Corless

(57) ABSTRACT

A position information processing device according to an exemplary embodiment of the present invention can include a GPS receiver adapted and configured to receive a first satellite signal, an interdevice receiver adapted and configured to receive a second satellite signal from a mobile phone, a GPS information processor adapted and configured to compare the first satellite signal with the second satellite signal and generate a third satellite signal for calculating a current position, and a controller adapted and configured to use the third satellite signal to calculate coordinates of the current position. The proposed position information processing device uses the satellite signal that is received from the mobile phone, and therefore the accuracy of the position measurement can be improved.

11 Claims, 3 Drawing Sheets

APPARATUS AND METHOD FOR PROCESSING POSITION INFORMATION

CROSS-REFERENCE TO RELATED APPLICATION

This application claims priority to and the benefit of Korean Patent Application No. 10-2011-0131206 filed in the Korean Intellectual Property Office on Dec. 8, 2011, the entire contents of which are incorporated herein by reference.

FIELD OF THE INVENTION

The present invention relates to a position information processing device and a position information processing method. More particularly, the present invention relates to a position information processing device and a position information processing method using a satellite signal that is received from a mobile phone.

BACKGROUND OF THE INVENTION

A position information processing device uses a region name, a phone number, and an address to offer route guide information to a destination. The position information processing device has to determine an accurate current position so as to offer the route guide information to the destination from the current position.

Generally, the position information processing device for the vehicle uses a single position measuring method. The single position measuring method uses one GPS receiver receiving satellite signals from satellites and measures present latitude, longitude, and elevation through triangulation. The satellite signal includes position vector information of the satellite, and a position information processing device uses a time that it takes the satellite signal to reach the position information processing device and position vector information of the satellite to measure the current position.

When one GPS receiver is used, an error of the position measurement can range within a radius of about 10 m. The position information processing device for a vehicle uses a MAP-matching method that matches the measured position on an electronic map to be able to compensate the error range to a radius of about 3 m. That is, the position information processing device for the vehicle has an error range of about 3 m to offer route guide information to a driver. When the vehicle runs on an express way or a simple wide road, a relatively accurate route guide is possible with the above error range.

If the vehicle runs on a complicated road or a narrow road where there are several roads within the error range, it is difficult to use the MAP-matching method and the position information processing device does not offer an accurate route guide.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a position information processing device and a position information processing method having advantages of using satellite signals that are received from a mobile phone to reduce an error range and to be able to calculate accurate position information.

A position information processing device according to an exemplary embodiment of the present invention can include a GPS receiver adapted and configured to receive a first satellite signal, an interdevice receiver adapted and configured to receive a second satellite signal from a mobile phone, a GPS information processor adapted and configured to compare the first satellite signal with the second satellite signal and generate a third satellite signal for calculating a current position, and a controller adapted and configured to use the third satellite signal to calculate coordinates of the current position.

The GPS information processor can generate the third satellite signal by computing a union of the first satellite signal and the second satellite signal.

The interdevice receiver can receive a proper identification ID from the mobile phone receive the second satellite signal if the proper identification ID is a registered proper identification ID.

The first satellite signal can include satellite signals of four satellites, and the second satellite signal includes satellite signals of four satellites that are different from the first satellite signal.

The interdevice receiver can operate in a 2,400-2,483.5 MHz frequency range.

A position information processing method according to another exemplary embodiment of the present invention can include receiving a first satellite signal through a GPS receiver, receiving a second satellite signal from a mobile phone, processing the first satellite signal and the second satellite signal to generate a third satellite signal for calculating a current position, and using a third satellite signal to calculate coordinates of a current position.

The processing the first satellite signal and the second satellite signal to make a third satellite signal step can include computing a union of the first satellite signal and the second satellite signal.

The position information processing method can further include displaying a message inquiring whether the second satellite signal from the mobile phone should be obtained before receiving the second satellite signal from the mobile phone.

The position information processing method can further include determining whether the mobile phone is paired if the second satellite signal is desired.

The determining whether the mobile phone is paired step can include pairing with the mobile phone if a proper identification ID of the mobile phone is a registered proper identification ID.

The mobile phone can transmit the second satellite signal in a 2,400-2,483.5 MHz frequency range.

A non-transitory computer readable medium according to another exemplary embodiment of the present invention can contain program instructions executed by a processor or controller for implementing a position information processing method. The computer readable medium can include: program instructions that receive a first satellite signal through a GPS receiver; program instructions that receive a second satellite signal from a mobile phone; program instructions that process the first satellite signal and the second satellite signal to generate a third satellite signal for calculating a current position; and program instructions that use a third satellite signal to calculate coordinates of a current position.

The proposed position information processing device uses the satellite signal that is received from the mobile phone to be able to use satellite signals of a maximum of eight GPS satellites, and therefore the accuracy of the position measurement can be improved.

DEFINITIONS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
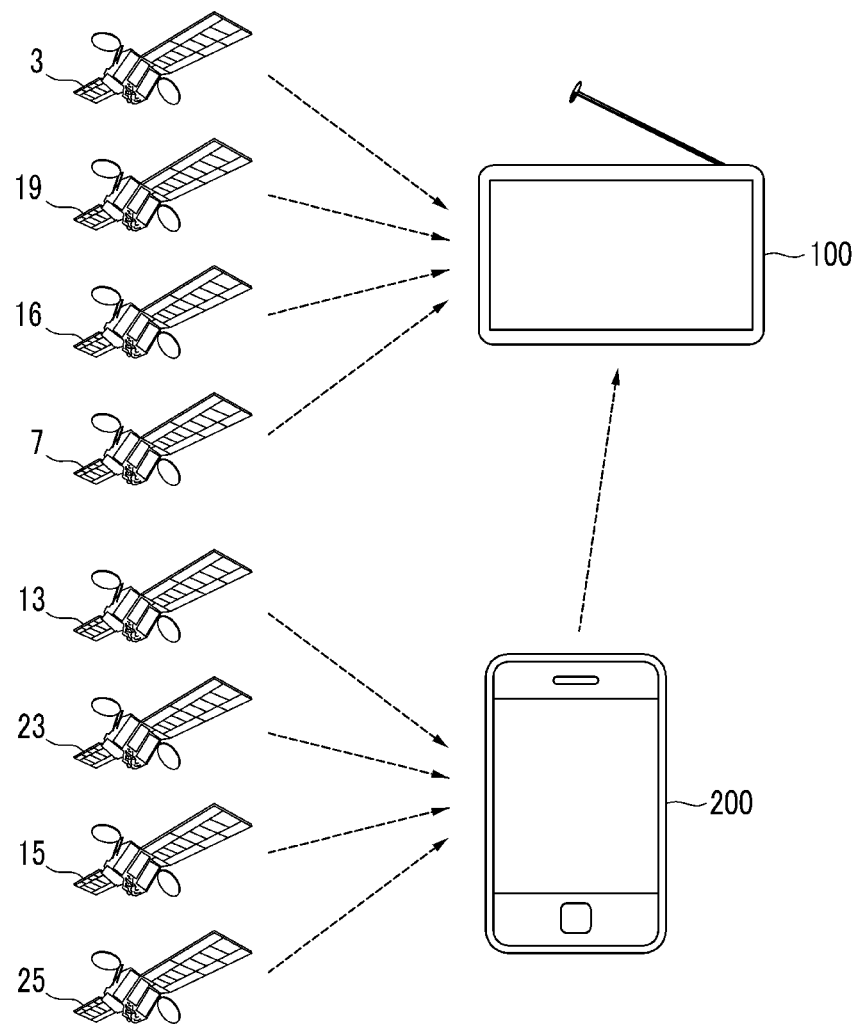
FIG. 1 is a block diagram showing a position information processing system according to an exemplary embodiment of the present invention.

The following list of reference characters is provided for the reader's convenience:
100: position information processing device
110: map information storage unit
120: navigation controller
130: Bluetooth receiver
140: GPS receiver
150: GPS information processor
200: mobile phone
210: GPS receiver
220: controller
230: Bluetooth transmitter

DETAILED DESCRIPTION OF THE EMBODIMENTS

The present invention will be described more fully hereinafter with reference to the accompanying drawings, in which exemplary embodiments of the invention are shown. The present invention is not limited to the exemplary embodiments, but may be embodied in various forms.

In the exemplary embodiments, constituent elements having the same configurations are designated by the same reference numerals. Further, in subsequent exemplary embodiments, only configurations that are different from the first exemplary embodiment are described.

Parts unrelated to the description are not described in order to describe the present invention more clearly, and the same or similar constituent elements are designated by the same reference numerals herein.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a block diagram showing a position information processing system according to an exemplary embodiment of the present invention.

Referring to FIG. 1, a position information processing device 100 receives a satellite signal from at least one of satellites 3, 19, 16, and 7. Further, a mobile phone 200 receives a satellite signal from at least one of satellites 13, 23, 15, and 25.

The satellites 3, 19, 16, and 7 from which the position information processing device 100 receives satellite signals can be different from the satellites 13, 23, 15, and 25 from which that the mobile phone 200 receives satellite signals. That is, a GPGSV (GPS Satellites in View) of a position information processing device 100 can be different from a GPGSV of the mobile phone 200. The GPGSV denotes information of all satellites from which the GPS receiver can receive.

For example, the GPGSV (GPS Satellites in View) of the position information processing device 100 can be $GPGSV, 3, 1, 10, 03, 86, 244, 00, 19, 51, 218, 38, 16, 51, 057, 00, 07, 40, 048, 00*77. That is, the position information processing device 100 can receive satellite signals of a first satellite 3, a second satellite 19, a third satellite 16, and a fourth satellite 7.

The GPGSV of the mobile phone 200 can be $GPGSV, 3, 1, 10, 13, 34, 279, 00, 23, 33, 236, 00, 15, 29, 076, 40, 25, 25, 143, 38*77. That is, the mobile phone 200 can receive satellite signals of a first satellite 13, a second satellite 23, a third satellite 15, and a fourth satellite 25.

When the position information processing device 100 is paired with the mobile phone 200, the position information processing device 100 receives the satellite signal that the mobile phone 200 receives. Also, the position information processing device 100 merges the first satellite signal that is received through its own GPS receiver and the second satellite signal that is received from the mobile phone 200 to output coordinates of the current position. That is, the position information processing device 100 can use a maximum of four first satellite signals that it can receive through its own GPS receiver and a maximum of four second satellite signals that the mobile phone 200 can receive.

The position information processing device 100 can use a maximum of eight satellite signals to achieve use of two GPS receivers. Accordingly, the position information processing device 100 decreases the error range of the position measure to within 1 m from 10 m.

The position information processing device 100 can be applied to a navigation device for a vehicle. When the position information processing device 100 is used as a navigation device for a vehicle, the number of satellite signals that the navigation device for a vehicle can receive can be extended to a maximum of eight to achieve accurate position measurement. That is, the navigation device for a vehicle can reduce the error range from 10 m to 1 m in the position measurement to inform a driver of an accurate route guide.

Further, the satellite information of the mobile phone 200 is used by the navigation device for a vehicle and the precision of the position detection is improved, and therefore it is not necessary to use expensive receiving equipment such as a DGPS (Differential Global Positioning System).

Also, the introduced position information processing device 100 can be applied to a navigation device for a vehicle, and also can be applied to various systems using position information of a vehicle. For example, the position information processing device 100 can be applied to an ADAS (Advanced Driver Assistance System) that offers front collision avoidance, a lane breakaway warning, a blind spot guard, an improved rear guard, and so on. In addition, the position information processing device 100 can frontally project a travel route during travel of the vehicle, and can be applied to an augmented reality HUD (Head Up Display) that matches the actuality therewith. An unmanned automatic driving vehicle without a driver needs accurate position detection, and the position information processing device 100 can offer accurate position information without the expensive DGPS equipment.

Hereinafter, it is described that the introduced position information processing device 100 is used as a navigation device for a vehicle. In a case that the position information processing device 100 is applied to a drive assistance device, an augmented reality HUD, or an unmanned automatic driving vehicle, the method that detects accurate position information by using the satellite information of the mobile phone 200 can be equally applied thereto.

Figure 2:
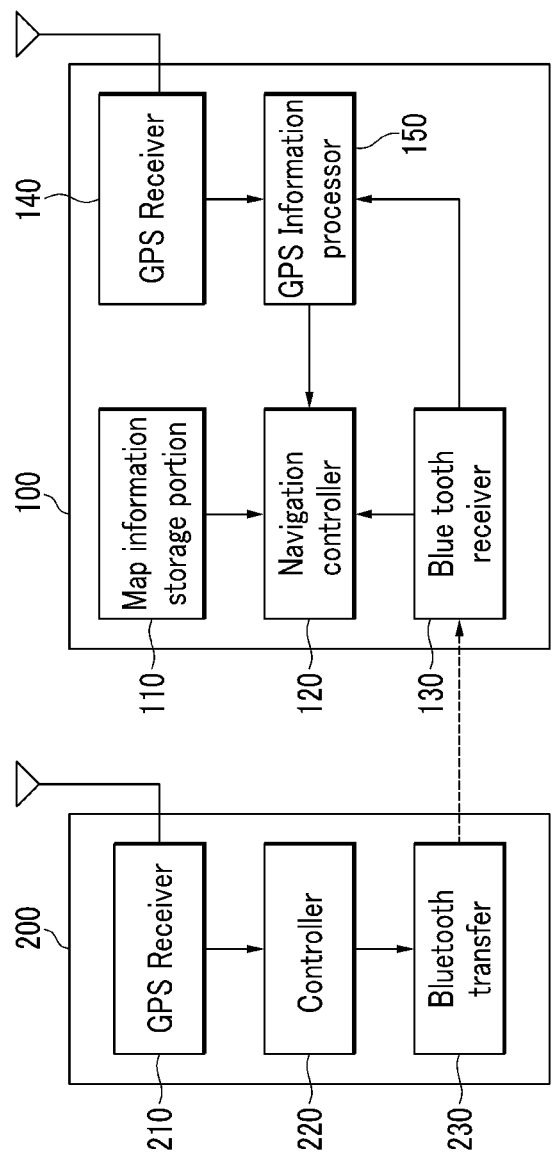
FIG. 2 is a block diagram showing a configuration of a position information processing device and a mobile phone according to an exemplary embodiment of the present invention.

FIG. 2 is a block diagram showing a configuration of a position information processing device and mobile phone according to an exemplary embodiment of the present invention.

Referring to FIG. 2, the mobile phone 200 includes a GPS receiver 210, a controller 220, and an interdevice transmitter 230.

The GPS receiver 210 receives a second satellite signal through an antenna. The GPS receiver 210 can receive the satellite signal of a first satellite 13, a second satellite 23, a third satellite 15, and a fourth satellite 25. The GPS receiver 210 transmits the received second satellite signal to the controller 220.

The controller 220 controls the overall function of the mobile phone 200. The controller 220 transmits the second satellite signal to a position information processing device 100 through the interdevice transmitter (or interdevice communication transmitter) 230.

The position information processing device 100 includes a map information storage unit 110, a navigation controller 120, an interdevice receiver 130, a GPS receiver 140, and a GPS information processor 150.

The map information storage unit 110 stores map information for a route guide.

The navigation controller 120 controls the overall function of the position information processing device 100. The navigation controller 120 calculates a current position by using the satellite signal, uses the map information stored in the map information storage unit 110 to display the current position, and displays a route from the current position to a destination.

In the calculating of the current position, the navigation controller 120 calculates coordinates of the current position based on the first satellite signal that is received through the GPS receiver 140 and/or the second satellite signal that is received by the mobile phone 200. The first satellite signal may include a maximum of four satellite signals, and the second satellite signal may include a maximum of four satellite signals that are different from those of the first satellite signal. The navigation controller 120 may use a maximum of eight satellites signals to calculate coordinates of the current position.

The interdevice receiver (or interdevice communication receiver) 130 receives the second satellite signal that is transmitted from the mobile phone 200. The interdevice receiver 130 receives a proper identification ID of the mobile phone 200, and can receive the second satellite signal from the mobile phone 200 having a registered proper identification ID. The interdevice receiver 130 transmits the second satellite signal that is received from the mobile phone 200 to the navigation controller 120 and/or GPS information processor 150.

Interdevice transmitter 230 and interdevice receiver 130 can utilize wired or wireless techniques to facilitate communication between mobile phone 200 and position information processing device 100. In one embodiment, the interdevice transmitter 230 and interdevice receiver 130 utilize the BLUETOOTH® wireless communication standard as established by Bluetooth SIG, Inc. of Kirkland, Wash. in the 2,400-2,483.5 MHz frequency range. For purposes of illustration, the interdevice transmitter 230 and interdevice receiver 130 are referred to as a Bluetooth transmitter 230 and Bluetooth receiver 130, respectively, in FIG. 2.

The GPS receiver 140 receives a satellite signal through an antenna. The GPS receiver 140 can receive the satellite signals of a first satellite 3, a second satellite 19, a third satellite 16, and a fourth satellite 7. The GPS receiver 140 transmits the received satellite signal to the GPS information processor 150.

The GPS information processor 150 compares the first satellite signal that is received through the GPS receiver 140 with the second satellite signal that is received through the interdevice receiver 130. The GPS information processor 150 generates a third satellite signal consisting of the union of the first satellite signal and the second satellite signal. For example, if the first satellite signal from GPS receiver 140 consists of data from satellites {3, 7, 16, 19} and the second satellite signal consists of data from satellites {13, 15, 23, 25}, the third satellite signal will be a set of data from satellites {3, 7, 13, 15, 16, 19, 23, 25}. In another example, if the first satellite signal from GPS receiver 140 consists of data from satellites {1, 2, 3, 4} and the second satellite signal consists of data from satellites {3, 4, 5, 6}, the third satellite signal will be a set of data from satellites {1, 2, 3, 4, 5, 6}. Accordingly, if the first satellite signal and the second satellite signal each consist of data from four satellites, the third satellite signal can include a minimum of four and a maximum of eight satellite signals.

Meanwhile, the GPS information processor 150 can intactly transmit the first satellite signal to the navigation controller 120, in a case that the second satellite signal is not received from the interdevice receiver 130 and only the first satellite signal is received from the GPS receiver 140. In this moment, the navigation controller 120 can calculate a coordinate of the current position by using the first satellite signal.

Also, in a case that the first satellite signal is not received through the GPS receiver 140, the interdevice receiver 130 can transmit the received second satellite signal to the navigation controller 120. At this moment, the navigation controller 120 uses the second satellite signal to be able to calculate coordinates of the current position.

That is, the navigation controller 120 uses the first satellite signal and the second satellite signal to be able to accurately calculate the coordinates of the current position, and when only the first satellite signal is received, only the first satellite signal is used to calculate the coordinates of the current position, while when only the second satellite signal is received, only the second satellite signal is used to calculate the coordinates of the current position.

Figure 3:
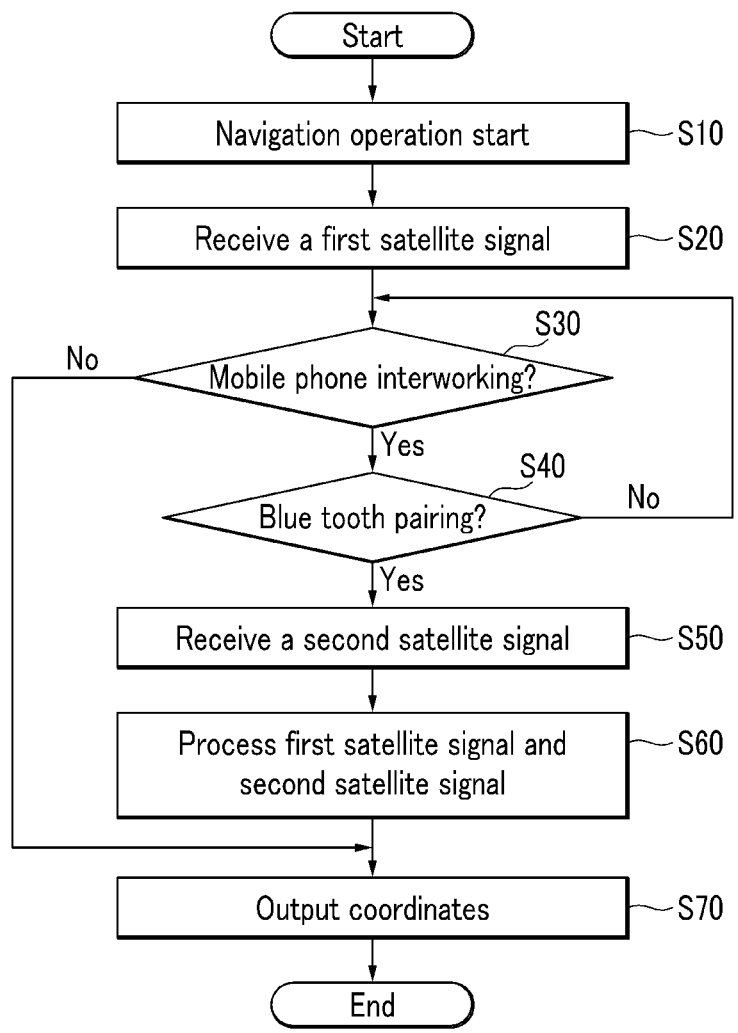
FIG. 3 is a flowchart showing a driving method of a position information processing device according to an exemplary embodiment of the present invention.

FIG. 3 is a flowchart showing a driving method of a position information processing device according to an exemplary embodiment of the present invention.

Referring to FIG. 3, a driving method using the position information processing device 100 as a navigation device will be described.

If a user turns on the power of the position information processing device 100, the position information processing device 100 starts the navigation operation (S10).

The position information processing device 100 receives the first satellite signal through the operation of the navigation device (S20). The first satellite signal can include satellite signals of a first satellite 3, a second satellite 19, a third satellite 16, and a fourth satellite 7.

The position information processing device 100 determines whether it is connected to the mobile phone to be operated (S30). The position information processing device 100 displays a message inquiring whether it is connected with the mobile phone to be operated to a user such that the user selects the interworking thereof. Or, the position information processing device 100 checks whether it is paired with a predetermined mobile phone, and in a case that it is paired with the mobile phone, it can determine the interworking with the mobile phone. In a case that it does not interwork with the mobile phone, the position information processing device 100 uses the first satellite signal to output the coordinates of the current position.

If the interworking with the mobile phone 200 is determined, the position information processing device 100 determines whether it is paired with the mobile phone 200 through Bluetooth (S40). The position information processing device 100 receives an ID of the mobile phone 200 from the mobile phone 200, and if the received proper identification ID is included in the registered proper identification ID, it can be paired with the mobile phone 200.

If it is not paired with the mobile phone 200, the position information processing device 100 can determine whether it interworks with the mobile phone.

If it is paired with the mobile phone 200, the position information processing device 100 receives the second satellite signal that is transmitted from the mobile phone 200 (S50). The second satellite signal can include a satellite signal of a first satellite 13, a second satellite 23, a third satellite 15, and a fourth satellite 25.

The position information processing device 100 processes the first satellite signal and the second satellite signal to the third satellite signal for calculating coordinates of the current position (S60). The position information processing device 100 compares creates a third satellite signal that is a union of the first satellite signal and the second satellite signal. The third satellite signal includes the first satellite signal and the second satellite signal. That is, the third satellite signal can include a minimum of four and a maximum of eight satellite signals.

The position information processing device 100 uses the third satellite signal to output coordinates of the current position (S70). That is, the position information processing device 100 uses the first satellite signal that it can receive itself and the second satellite signal that the mobile phone 200 can receive to calculate coordinates of the current position.

In a case that only the first satellite signal measures the position, the error range is a radius of 10 m, and in a case that the first satellite signal and the second satellite signal is used to measure the position, the error range is within a radius of 1 m. Accordingly, the position information processing device 100 accurately outputs coordinates of the current position.

In this way, the position information processing device 100 further accurately calculates the position coordinates of the vehicle by the interworking of GPS information for a vehicle and GPS information of the mobile phone.

As stated above, it is described that the mobile phone 200 transmits the second satellite information to the position information processing device 100, but a device that transfers the second satellite information to the position information processing device 100 can be any device that can receive the satellite signal as well as the mobile phone 200. For example, a GPS receiver that is separately disposed in a vehicle can transmit the second satellite information to the position information processing device 100. Also, a plurality of devices as well as one mobile phone 200 can be multiply paired with the position information processing device 100, and the second satellite information can be transmitted to the position information processing device 100 from the plurality of devices.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Furthermore, the control logic of the present invention can be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

What is claimed is:

1. A position information processing device, comprising;
    a GPS receiver adapted and configured to receive a first satellite signal including satellite signals from a first set of four visible satellites;
    an interdevice communication receiver adapted and configured to receive, from a mobile phone, a second satellite signal including satellite signals from a second set of four visible satellites different from the satellite signals from the first set of four visible satellites;
    a GPS information processor adapted and configured to compare the first satellite signal with the second satellite signal and generate a third satellite signal based on the first satellite signal and the second satellite signal, wherein the third satellite signal includes the satellite signals from the first set of four visible satellites and the satellite signals from the second set of four visible satellites; and a navigation controller adapted and configured to use the third satellite signal to calculate coordinates of a current position.

2. The position information processing device of claim 1, wherein the GPS information processor is further adapted and configured to generate the third satellite signal by computing a union of the first satellite signal and the second satellite signal.

3. The position information processing device of claim 1, wherein the interdevice communication receiver is adapted and configured to receive a proper identification ID from the mobile phone, and the interdevice communication receiver is adapted and configured to receive the second satellite signal if the proper identification ID is a registered proper identification ID.

4. The position information processing device of claim 1, wherein the interdevice communication receiver operates in a 2,400-2,483.5 MHz frequency range.

5. A position information processing method, comprising:
receiving, through a GPS receiver, a first satellite signal including satellite signals from a first set of four visible satellites;
receiving, from a mobile phone, a second satellite signal including satellite signals from a second set of four visible satellites different from the satellite signals from the first set of four visible satellites;
processing the first satellite signal and the second satellite signal to generate a third satellite signal based on the first satellite signal and the second satellite signal, wherein the third satellite signal includes the satellite signals from the first set of four visible satellites and the satellite signals from the second set of four visible satellites; and
using the third satellite signal to calculate coordinates of a current position.

6. The position information processing method of claim 5, wherein the processing of the first satellite signal and the second satellite signal to generate a third satellite signal step includes computing a union of the first satellite signal and the second satellite signal.

7. The position information processing method of claim 5, further comprising displaying a message inquiring whether the second satellite signal from the mobile phone should be obtained before receiving the second satellite signal from the mobile phone.

8. The position information processing method of claim 7, further comprising determining whether the mobile phone is paired if the second satellite signal is desired.

9. The position information processing method of claim 8, wherein the determining whether the mobile phone is paired step includes pairing with the mobile phone, if a proper identification ID of the mobile phone is a registered proper identification ID.

10. The position information processing method of claim 5, wherein the mobile phone transmits the second satellite signal in a 2,400-2,483.5 MHz frequency range.

11. A non-transitory computer readable medium containing program instructions executed by a processor or controller for implementing a position information processing method, the computer readable medium comprising:
program instructions that receive, through a GPS receiver, a first satellite signal including satellite signals from a first set of four visible satellites;
program instructions that receive, from a mobile phone, a second satellite signal including satellite signals from a second set of four visible satellites differing from the satellite signals from the first set of four visible satellites;
program instructions that process the first satellite signal and the second satellite signal to generate a third satellite signal based on the first satellite signal and the second satellite signal, wherein the third satellite signal includes the satellite signals from the first set of four visible satellites and the satellite signals from the second set of four visible satellites; and
program instructions that use the third satellite signal to calculate coordinates of a current position.

\* \* \* \* \*